Dec. 26, 1933.   T. P. BALL   1,940,990
VALVE
Filed July 26, 1929
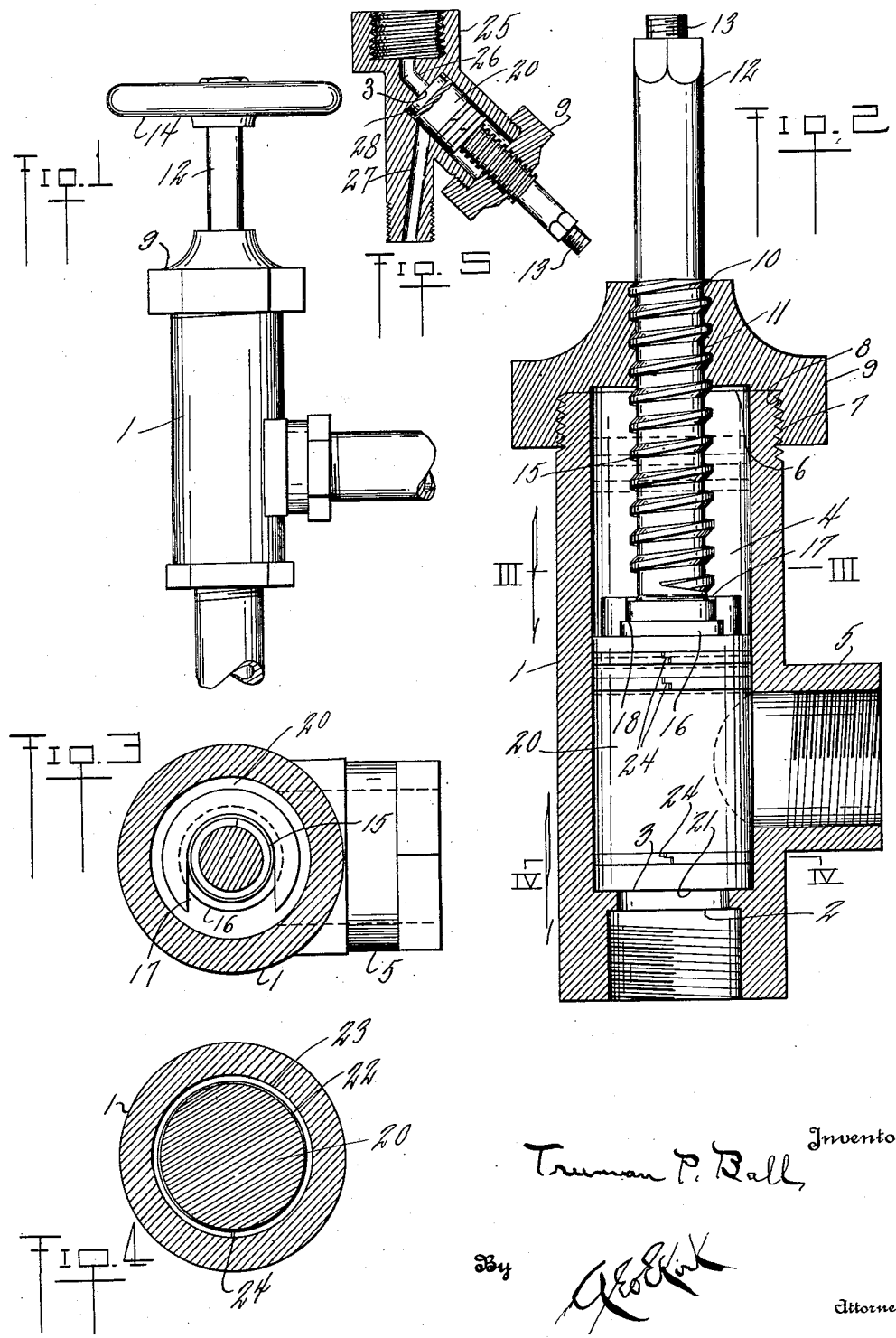
Truman P. Ball, Inventor
By [signature], Attorney Patented Dec. 26, 1933

1,940,990

UNITED STATES PATENT OFFICE 1,940,990

VALVE

Truman P. Ball, Toledo, Ohio

Application July 26, 1929. Serial No. 381,119

1 Claim. (Cl. 251—77)

This invention relates to packless valves and valve structures.

This invention has utility when incorporated in plunger valves having loose sealing rings.

Referring to the drawing:

Fig. 1 is a side elevation of an embodiment of the invention in an angle valve;

Fig. 2 is a longitudinal section through the valve of Fig. 1, on an enlarged scale;

Fig. 3 is a section on the line III—III, Fig. 2, looking in the direction of the arrow;

Fig. 4 is a section on the line IV—IV, Fig. 2, looking in the direction of the arrow; and Fig. 5 is a section of a boiler gage glass blow off valve embodying the invention.

Valve housing 1 is shown as having port 2 about which is seat 3 from which extends cylindrical chamber 4, having lateral outlet 5 therefrom. The housing 1 has opening 6 toward the seat 3. Adjacent this opening 6 the housing 1 has externally threaded portion 7 with which may engage threaded portion 8 of cap 9. The cap 9 has central opening 10 therethrough with internally threaded region 11.

Stem 12 for the valve has threaded terminus 13 for mounting hand wheel 14. This stem 12 has threaded region 15 coacting with the threaded region 11 of the cap 9, thereby effective in stem rotation for actuating the stem lengthwise. The inner end of the stem 12 has head 16 laterally insertable in U-shaped slot 17 under ledge or overhang 18 in thereby providing swivel assembly of plunger 20 for reciprocation with the stem 12 as to the housing 1 in the chamber 4. This plunger 20 has closure terminus 21 for coacting with the seat 3. The plunger 20 is of cylindrical form coacting as a piston as guided in the cylindrical chamber 4 of the housing 1. Endless annular grooves 22 in the plunger 20 provide seats for loose rings 23, having notched overlapping termini 24. These rings 23 have frictional and effective packing coaction against leakage past the plunger of fluid, whether steam, gas, water, oil, etc., and thus provide a simple form of packless valve.

Valve housing 25 (Fig. 5) has inlet port 26 and outlet port 27. The plunger 20 is shown as having terminally seated thereon to be carried thereby, fiber gasket 28.

The number and location of the loose rings may be varied. In usual practice, even with steam, two rings usually suffice between the outlet port and the cap. The valve of the disclosure herein may have its housing adapted to various pipe fitting relations in the usual range of valve placings. The plunger assembly with the stem of the valve permits of ready replacement as the seat becomes worn. The loose rings are readily snapped into plunger mounted position in the respective grooves.

What is claimed and it is desired to secure by Letters Patent is:

A valve housing having an inlet port provided with an endless ledge forming a seat, an outlet port in communication through the housing with one side of the seat, a piston way in the housing toward said seat, a cylindrical piston in the way to seat on said ledge, said piston having equal length parallel grooves in the cylindrical walls of the piston near opposite ends thereof, parallel, piston rings in said grooves, an externally threaded stem for the piston, an internally threaded cap for the way coacting with the threaded stem, and means for rotating the stem for effecting reciprocation of the piston to seat directly against the ledge and close the valve inlet port, whereby in the closed valve, leakage from the inlet is prevented by a substantial area contact between the piston end and said ledge and one of said piston rings disposed between said inlet and outlet ports, said piston when oppositely moved being clear of the ledge to open the inlet port and clear of the outlet port, a pair of spaced piston rings providing against flow between the ports and past the piston toward the housing cap, there being a quick detachable swivel connection between the piston and stem involving a pair of different diameter cylindrical portions on the stem terminus, the one nearer the end being larger and providing a ledge, said piston having a U-shaped terminal portion embracing the smaller cylindrical portion of the stem, said U-shaped portion having an undercut on the inner side to interfit with said larger cylindrical portion of the stem.

TRUMAN P. BALL.